United States Patent
Kanehira et al.

Patent Number: 6,077,181
Date of Patent: *Jun. 20, 2000

[54] PLATE FOR A SILENT CHAIN HAVING A PROTRUDING PORTION FOR REDUCING THE NOISE GENERATED WHEN THE PLATE ENGAGES A SPROCKET

[75] Inventors: Makoto Kanehira, Saitama-ken; Takero Nakagawa, Osaka-fu; Masao Maruyama, Saitama-ken; Hitoshi Ohara, Saitama-ken; Nobuyuki Fujimoto, Saitama-ken; Masahiro Sato, Oita-ken, all of Japan

[73] Assignee: Tsubakimoto Chain Co., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/873,728

[22] Filed: Jun. 12, 1997

[30] Foreign Application Priority Data

Jun. 13, 1996 [JP] Japan ................................ 8-152640

[51] Int. Cl.⁷ .................................. F16G 13/04
[52] U.S. Cl. .......................... 474/212; 474/217; 474/202; 474/206
[58] Field of Search .................... 474/213, 202, 474/206, 212, 214, 215, 216, 217

[56] References Cited

U.S. PATENT DOCUMENTS

| | | | |
|---|---|---|---|
| 1,598,906 | 9/1926 | Dull | 474/214 |
| 1,602,697 | 10/1926 | Morse | 474/213 |
| 1,638,388 | 8/1927 | Belcher | 474/214 X |
| 4,758,210 | 7/1988 | Ledvina | 474/212 |
| 4,759,740 | 7/1988 | Cradduck | 474/213 X |
| 4,832,668 | 5/1989 | Ledvina et al. | 474/155 |
| 4,915,675 | 4/1990 | Avramidis . | |
| 4,915,676 | 4/1990 | Komeya . | |
| 5,154,674 | 10/1992 | Avramidis et al. | 474/214 |
| 5,435,789 | 7/1995 | Avramidis | 474/206 |

FOREIGN PATENT DOCUMENTS

| | | | |
|---|---|---|---|
| 1-56304 | 11/1989 | Japan . | |
| 6-159446 | 6/1994 | Japan . | |
| WO 82/00866 | 3/1982 | WIPO | 474/212 |

*Primary Examiner*—Daniel P. Stodola
*Assistant Examiner*—Gregory J. Strimbu
*Attorney, Agent, or Firm*—Armstrong, Westerman, Hattori, McLeland & Naughton

[57] ABSTRACT

A silent chain has a plurality of interconnected plates adapted for operative engagement with toothed surfaces of a sprocket. Each of the plates has flank surface portions and crotch surface portions, with the crotch surface portions having protruding portions. The protruding portions of the crotch surface portions make contact with the toothed surfaces of the sprocket at the beginning of engagement of each plate with the sprocket and are spaced away from the toothed surfaces of the sprocket at least during engagement of the flank surface portions with toothed surfaces of the sprocket.

1 Claim, 4 Drawing Sheets

Fig. 1
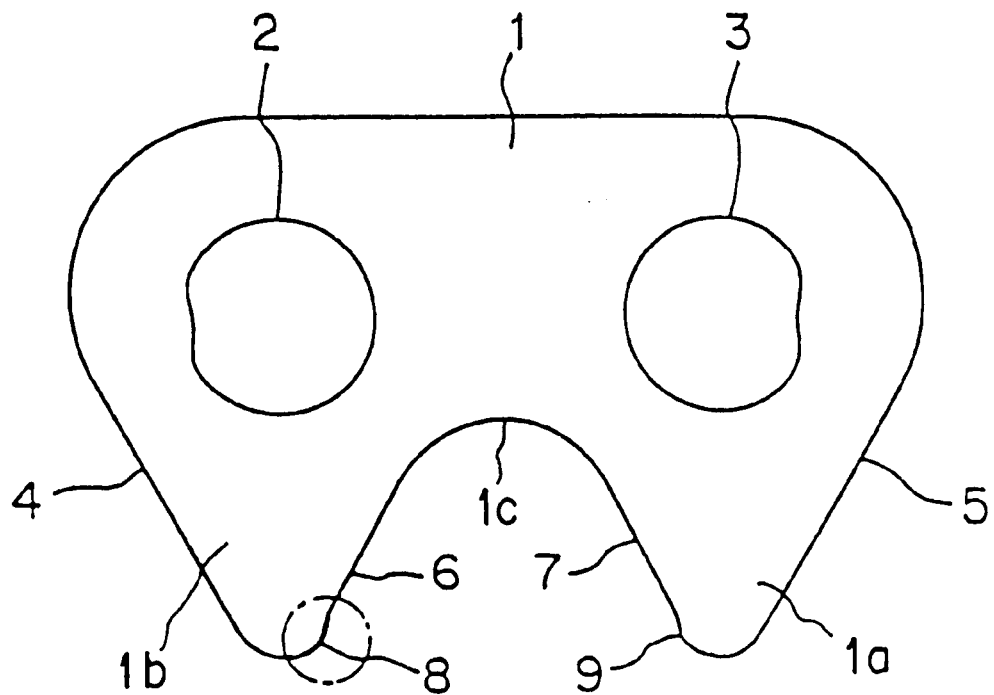
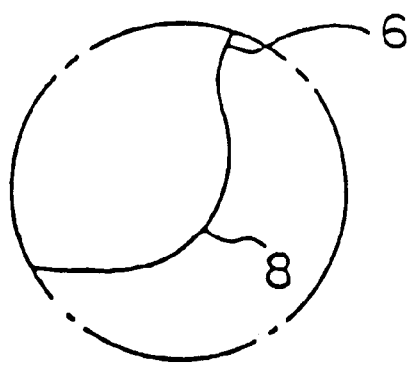
Fig. 1A

PLATE FOR A SILENT CHAIN HAVING A PROTRUDING PORTION FOR REDUCING THE NOISE GENERATED WHEN THE PLATE ENGAGES A SPROCKET

TECHNICAL FIELD OF THE INVENTION

The present invention relates to a plate of a silent chain having a structure capable of reducing noise generated upon engagement of the plate with a sprocket.

BACKGROUND OF THE INVENTION

Heretofore, various improvements for diminishing noise generated during operation of chain have been made as to the plate of a silent chain for use in an engine. For example, in Japanese Patent Laid Open No. 159446/94, a protruding portion, for interference with a toothed surface of a sprocket at the time of engagement of a plate of a silent chain with the toothed surface of the sprocket, is formed on the tip end side of a flank portion of the plate.

More particularly, as shown in FIG. 4, a protruding portion D is formed on the tip end side of a flank portion F of a plate P which comes into engagement with a toothed surface T of a sprocket S. The protruding portion D interferes with the toothed surface T of the sprocket S when the plate P, which is a part of a silent chain, starts into engagement with the toothed surface T of the sprocket S. Then, the other side of the flank portion F opposite the protruding portion D comes into contact and engagement with the toothed surface T. This engagement of the other side of the flank portion F opposite the protruding portion D with the toothed surface T of the sprocket S is continued until the plate P leaves the sprocket S.

In the silent chain of the above-described construction, since the protruding portion D comes into engagement with the toothed surface T of the sprocket S at the beginning of the engagement of the plate P with the toothed surface T of the sprocket S and in advance of engagement of the flank portion F with the toothed surface T of the sprocket S, a shock of engagement is buffered. Besides, since the height of engagement changes, a chordal oscillation of the chain is prevented and hence, it is possible to diminish the resulting noise.

However, the toothed surface of a sprocket which comes into engagement with a silent chain will vary depending on whether the silent chain is assembled entirely by using plates each having the aforesaid protruding portion or whether the silent chain is assembled in such a manner that the plates each having the aforesaid protruding portion are arranged only in several specific positions each between adjacent normal plates, even if either silent chain is fabricated at the same pitch as that of a silent chain assembled using normal plates not having any such protruding portion.

Therefore, it is necessary to fabricate plural types of sprockets conforming to plural types of silent chains. For example, when sprocket teeth are formed with a hob cutter, it is required in gear cutting that the addendum modification coefficient be changed for each type of a silent chain. Thus, there arises the problem that the sprocket fabricating process and stock management become complicated.

Accordingly, it is an object of the present invention to provide a plate of a silent chain capable of reducing an engagement noise and applicable to a sprocket which is used for an ordinary type of a silent chain.

SUMMARY OF THE INVENTION

According to the present invention, in order to achieve the above-mentioned object, a plate of a silent chain is provided which is adapted to engage a toothed surface of a sprocket at a flank surface portion of the plate. The plate of the silent chain is characterized in that a crotch surface portion of the plate is formed with a protruding portion. The protruding portion comes into contact with the toothed surface of the sprocket before the flank surface portion of the plate starts engagement with the toothed surface of the sprocket. The protruding portion is spaced away from the toothed surface of the sprocket at least during engagement of the flank portion of the plate with the toothed surface of the sprocket.

When the plate of a silent chain, according to the present invention, engages a sprocket, the protruding portion formed on the crotch portion of the plate comes into contact with a toothed surface of the sprocket before engagement of the plate flank surface portion with the toothed surface of the sprocket. Then the flank surface portion comes into contact with the toothed surface. In this contacted state of the flank surface portion with the toothed surface of the sprocket, the protruding portion is spaced away from the toothed surface of the sprocket, and the contacted state continues until the plate leaves the sprocket, thereby effecting the transfer of power.

Since the protruding portion comes into engagement and sliding contact with the toothed surface of the sprocket before engagement of the flank surface portion with the toothed surface of the sprocket, the shock of engagement is buffered and hence, the resulting noise is diminished. In this case, since the protruding portion is formed on the crotch portion, the flank surface portion for engagement with the toothed surface of the sprocket can be formed of the same contour as the contour of the plate used in an ordinary type of a silent chain. In other words, it is possible to directly use a sprocket for an ordinary type of a silent chain having the same pitch as the pitch of the silent chain related to the invention.

BRIEF DESCRIPTION OF THE DRAWINGS

FIG. 1 is a side view of a plate of a silent chain according to a first embodiment of the present invention;

FIG. 1A is an enlarged fragmentary view showing part of a protruding portion in a circle illustrated in FIG. 1.

DETAILED DESCRIPTION OF THE INVENTION

Figure 2:
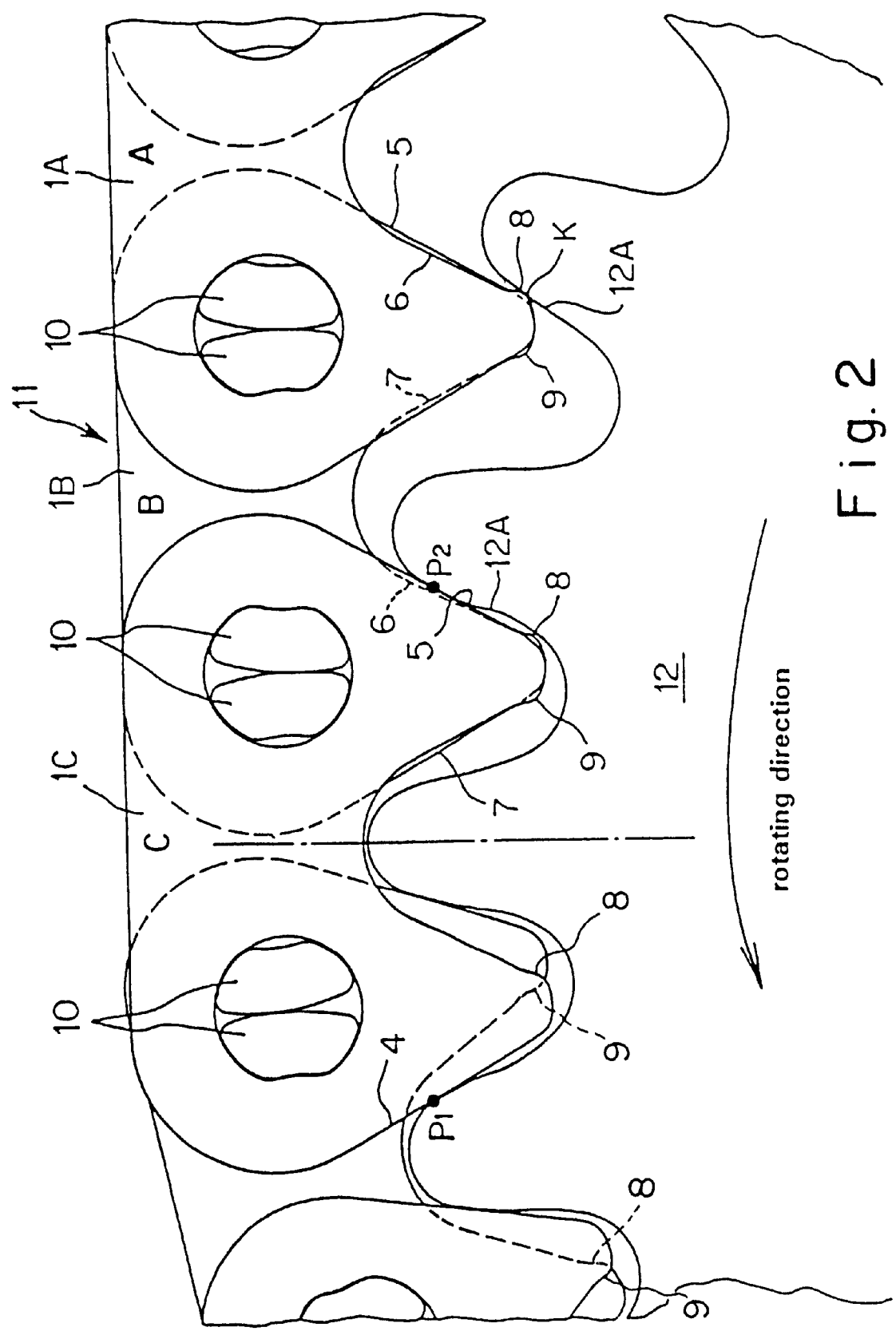
FIG. 2 is a diagram showing a state of engagement between a silent chain fabricated using the plates of FIG. 1 and a sprocket.

The present invention will be described in detail hereinunder with reference to the accompanying drawings. FIG. 1 illustrates a plate of a silent chain according to an embodiment of the present invention. Referring to FIG. 1, a plate 1 is shown with two pin holes 2 and 3. The plate 1 has a pair of teeth 1a, 1b, seperated by a crotch 1c. Flank surface portions 4 and 5 are formed on both outer sides of the plate 1 and constitute surfaces for engagement with a sprocket when such plates are assembled into a silent chain. A pair of crotch surface portions 6 and 7 are formed on inner sides of the plate 1 in opposed relation to each other.

Protruding portions 8 and 9, respectively, are formed on the tip end sides of the crotch portions 6 and 7. Each protruding portion 8 and 9 has a curvilinear contour. The protruding portions 8 and 9 are formed in a protruding fashion from a rectilinear contour of the crotch portions 6 and 7. The protruding portions 8 and 9 are positioned at a first distance from the crotch 1c of the at least one of the pair of the teeth 1a, 1b and at a second distance from the tip end of the at least one of the pair of the teeth 1a, 1b. The first distance is greater than the second distance.

FIG. 2 illustrates the state in which a silent chain assembled using the plates of the above-described construction comes into engagement with a sprocket. Adjacent plates 1A, 1B, 1C, are interconnected bendably by means of chain pins 10 to constitute a silent chain 11.

As shown in FIG. 2, the plate 1A of the silent chain 11 has advanced to position A with the rotation of a sprocket 12. In this position, the protruding portion 8, formed on the crotch surface portion 6 located on the front side in the advancing direction of the chain, begins to engage at position K with a toothed surface 12A of the sprocket 12 which has rotated from behind. Then, the curved surface of the protruding portion 8 comes into sliding contact with the toothed surface 12A.

As to the plate 1B which has moved to position B ahead of the plate 1A, the protruding portion 8 formed on its front crotch surface portion 6 leaves the toothed surface 12A of the sprocket 12 with rotation of the sprocket 12, and the flank portion located on the rear side moves relatively toward the toothed bottom side with respect to the toothed surface 12A and begins to slide in contact with the toothed surface 12A.

As to the plate 1C, which is located at position C preceding the plate 1B, the flank surface portions 4 and 5 located on both sides thereof mesh with two teeth of the sprocket 12 completely at meshing points P1 and P2 and are held stably on the sprocket 12.

Reference will now be made to a single plate. The plate 1A, which has advanced to position A, further moves to position C via position B with the rotation of the sprocket 12. In this case, at position A, the front protruding portion 8 first begins to contact with the toothed surface 12A of the sprocket 12. Thereafter the rear flank surface portion 5 comes into sliding contact with the toothed surface 12A of the sprocket 12 and gradually assumes a state of deeper engagement. Lastly, the front flank surface portion 4 comes into abutment and meshes with the toothed surface 12A of the sprocket 12. Therefore, a shock is reduced at the instant of engagement between the silent chain 11 and the sprocket 12, whereby the resulting noise is diminished.

When the rotating direction of the sprocket 12 reverses in FIG. 2, or when the chain 11 and the sprocket 12 become disengaged from each other, the protruding portion 9 formed on the crotch surface portion 7 of each plate substitutes the protruding portion 8 and comes into contact with the toothed surface 12A of the sprocket 12 at the beginning of chain-sprocket engagement.

Figure 3:
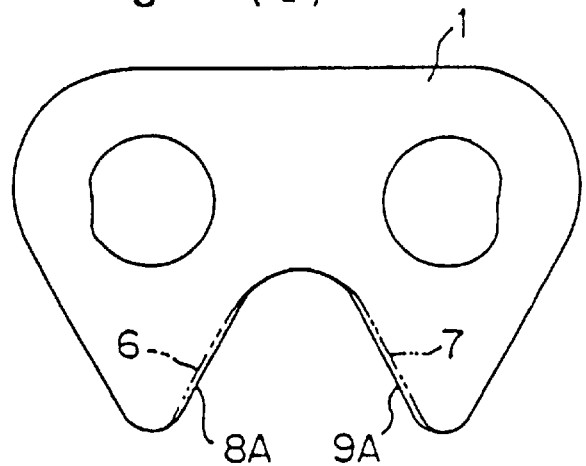
FIG. 3(a) is a diagram showing a plates of silent chains according to a second embodiment in which each plate has protruding portions over the entire crotch faces.
FIG. 3(b) shows a plates of silent chains according to a third embodiment in which each plate has protruding portions over the entire crotch faces.
FIG. 3(c) shows a plates of silent chains according to a fourth embodiment having a protruding portion on only one crotch face.
Figure 3:
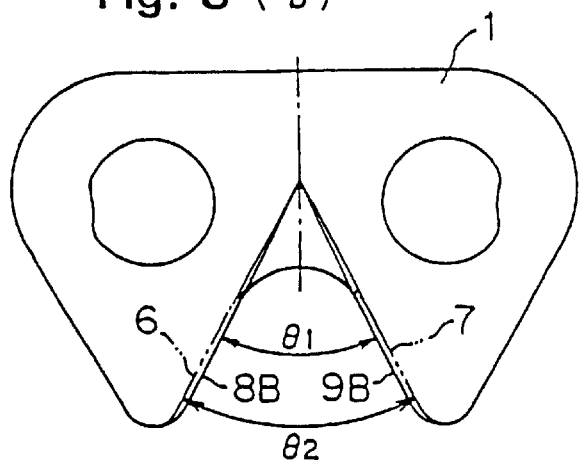
Figure 3:
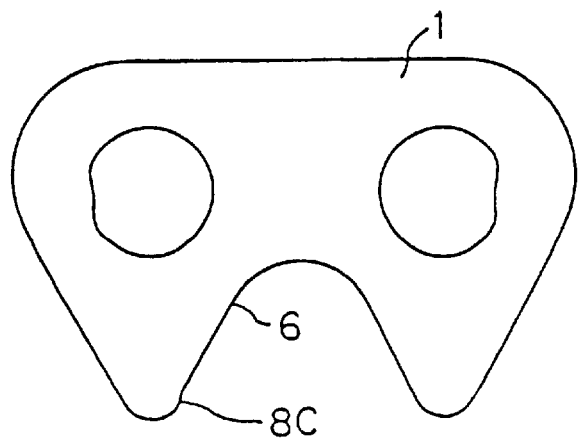
Figure 4:
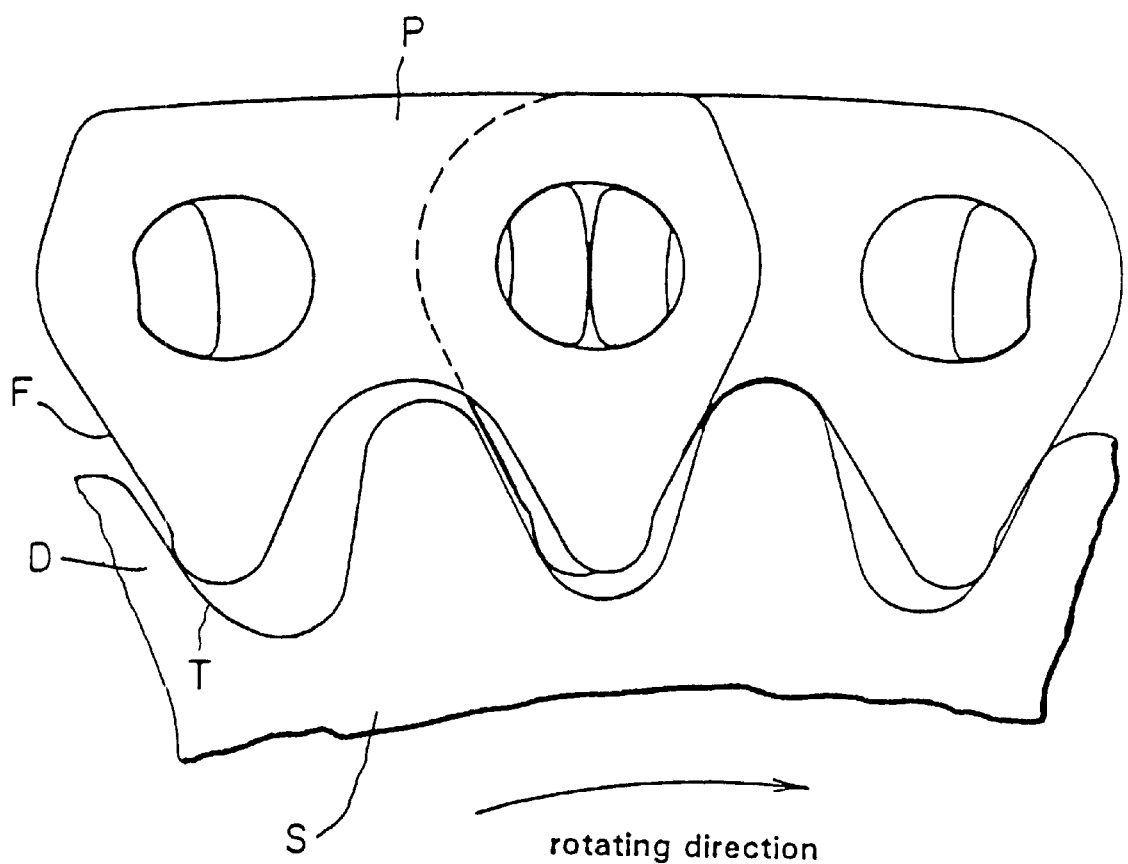
FIG. 4 is a diagram showing an example of a plate used in a conventional silent chain.

FIGS. 3(*a*)–(*c*) illustrates plates of silent chains according to other embodiments of the present invention. In the previous embodiment the protruding portions 8 and 9 are formed on the tip end sides of both inside, opposed crotch surface portions 6 and 7, respectively, as shown in FIG. 1, while a plate 1 shown in FIG. 3(*a*) has protruding portions 8A and 9A formed throughout the entire areas of both inside, opposed crotch surface portions 6 and 7, respectively.

The plate shown in FIG. 3(*b*) has crotch surface portions 6 and 7 which are spaced from each other at an angle $\theta_1$ smaller than the spaced angle $\theta_2$ of crotch portions in the conventional chain plate, thereby providing protruding portions 8B and 9B whose protruding width increases linearly toward the tip end side.

Further, the plate shown in FIG. 3(*c*) is for use in a silent chain entrained on a sprocket which is rotated in only one direction. In this embodiment, a protruding portion 8C is formed on only a crotch surface portion 6 that serves as a front-side crotch portion when the plates in question, indicated at 1, are assembled into a silent chain and entrained on the sprocket.

The shape of the protruding portion is not limited to those described in the above embodiments. It suffices if only the protruding portion is formed in a contour such that the protruding portion makes contact with a toothed surface of a sprocket at the beginning of plate-sprocket engagement and is spaced away from the toothed surface at least during engagement of a flank surface portion of the plate with the toothed surface of the sprocket.

Further, in assembling a silent chain using plates according to the present invention, not only it is possible to connect a plurality of only the plates of the invention into a silent chain, but also it is possible to combine the plates of the invention with plates of a conventional silent chain and arrange them at several specific positions each between adjacent such conventional plates.

In the plate of a silent chain according to the present invention, as set forth above, a protruding portion is formed on a crotch surface portion of the plate. The protruding portion comes into contact with a toothed surface of a sprocket at the beginning of engagement of the plate with the sprocket and is spaced away from the toothed surface of the sprocket at least during engagement of a flank surface portion of the plate with the toothed surface of the sprocket. Therefore, when such plates according to the present invention are assembled into a silent chain, the above protruding portion makes contact with the toothed surface of the sprocket before engagement of a flank portion of each plate with the toothed surface of the sprocket, whereby the shock of engagement is buffered and hence, the resulting noise can be diminished.

Besides, the flank portion of the plate for engagement with the toothed surface of the sprocket may be formed to have the same contour as that of the plate of a conventional silent chain. Therefore, for a silent chain fabricated using only the plates having the protruding portion, or for a silent chain fabricated by arranging the plates having the protruding portion at several specific positions in combination with the plates of a conventional silent chain, a sprocket for a conventional silent chain having the same pitch as the pitch of those silent chains can be used without any change. Thus, it is possible to simplify the manufacture and stock management of sprockets.

What is claimed is:

1. A silent chain and sprocket drive comprised of a sprocket having a toothed surface and a chain having a plurality of interconnected plates, each of said plates comprising:

a pair of teeth separated by a crotch, each of said teeth having a tip end and defined jointly by a flank surface portion and a crotch surface portion converging together at said tip end, said crotch surface portion of each said tooth being located closer to said crotch than said flank surface portion of each said tooth, said crotch surface portion of at least one of said pair of teeth having a protruding portion, said flank surface portion and said crotch surface portion of each said tooth being engagable with the toothed surface of the sprocket, said protruding portion being in engagement with the toothed surface of the sprocket before engagement of said flank surface portion of said at least one of said pair of teeth with the toothed surface of the sprocket, said protruding portion being spaced away from the toothed surface of the sprocket at least during engagement of said flank surface portion of said at least one of said pair of teeth with the toothed surface of the sprocket, wherein said protruding portion is formed adjacent to said tip end of said of said at least one of said pair of teeth and is positioned at a first distance from said crotch and at a second distance from said tip end of said at least one of said pair of teeth, the first distance being greater than the second distance, and wherein said crotch surface portions each have a rectilinear contour, and said protruding portion has a curvilinear contour and protrudes from said rectilinear contour of said crotch surface portion of said at least one of said pair of teeth.

* * * * *